United States Patent
Noh et al.

(10) Patent No.: US 11,362,715 B2
(45) Date of Patent: Jun. 14, 2022

(54) METHOD AND DEVICE FOR SETTING REFERENCE SIGNAL IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Taehyoung Kim, Gyeongg-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/762,396

(22) PCT Filed: Nov. 15, 2018

(86) PCT No.: PCT/KR2018/014001
§ 371 (c)(1),
(2) Date: May 7, 2020

(87) PCT Pub. No.: WO2019/098707
PCT Pub. Date: May 23, 2019

(65) Prior Publication Data
US 2020/0287607 A1 Sep. 10, 2020

(30) Foreign Application Priority Data
Nov. 17, 2017 (KR) .................. 10-2017-0154192

(51) Int. Cl.
*H04B 7/06* (2006.01)
*H04L 5/00* (2006.01)
*H04L 1/00* (2006.01)

(52) U.S. Cl.
CPC ......... *H04B 7/0626* (2013.01); *H04L 1/0013* (2013.01); *H04L 5/0051* (2013.01); *H04L 5/0082* (2013.01)

(58) Field of Classification Search
CPC ..... H04L 1/0013; H04L 1/001; H04L 1/0009; H04L 1/0067; H04L 1/0068;
(Continued)

(56) References Cited

U.S. PATENT DOCUMENTS

| 9,107,213 B2 | 8/2015 | Ng et al. |
| 2013/0114535 A1 | 5/2013 | Ng et al. |

(Continued)

FOREIGN PATENT DOCUMENTS

| CA | 3 008 326 | 8/2017 |
| EP | 2 548 313 | 1/2013 |

(Continued)

OTHER PUBLICATIONS

U.S. Appl. No. 62/554,586 Inventors: Jiwon Kang, Kilborn Lee, Jonghyun Park, Sukhyon Yoon, Kijun Kim Invention Title: Methods for configuring RS for fine time/frequency tracking Date: Sep. 6, 2017 (Year: 2017).*

(Continued)

*Primary Examiner* — Phong La
(74) *Attorney, Agent, or Firm* — The Farrell Law Firm, P.C.

(57) ABSTRACT

Provided is a method, performed by a user equipment (UE), of communicating based on reference signal configuration, the method including receiving, from a base station (BS), channel state information reference signal (CSI-RS) resource setting; determining whether CSI-RS reporting setting corresponding to the CSI-RS resource setting is allocated; and based on a result of the determining, determining whether to generate CSI.

11 Claims, 14 Drawing Sheets

(58) Field of Classification Search
CPC ... H04L 5/0051; H04L 5/0082; H04L 5/0078; H04L 5/0087; H04L 5/0048; H04L 5/003; H04L 5/0064; H04B 7/0626; H04B 7/0621; H04B 7/0623; H04B 7/0632
USPC .......................................................... 370/329
See application file for complete search history.

(56) References Cited

U.S. PATENT DOCUMENTS

| | | | |
|---|---|---|---|
| 2016/0301505 A1 | 10/2016 | Furuskog et al. | |
| 2018/0145809 A1* | 5/2018 | Kwak | H04L 5/0051 |
| 2018/0198510 A1* | 7/2018 | Park | H04W 24/10 |
| 2019/0058517 A1* | 2/2019 | Kang | H04L 5/0048 |
| 2019/0109679 A1* | 4/2019 | Liu | H04L 5/005 |
| 2019/0132099 A1* | 5/2019 | Wu | H04L 1/00 |
| 2019/0149211 A1* | 5/2019 | Nilsson | H04B 7/0695 375/267 |
| 2019/0190673 A1* | 6/2019 | Kwak | H04B 7/0421 |
| 2019/0199420 A1* | 6/2019 | Faxer | H04B 7/0632 |
| 2019/0364546 A1* | 11/2019 | Kwak | H04W 72/042 |
| 2020/0052847 A1* | 2/2020 | Manolakos | H04L 5/0094 |
| 2020/0092062 A1* | 3/2020 | Yum | H04L 1/1614 |
| 2020/0112355 A1* | 4/2020 | Park | H04B 7/0626 |
| 2020/0119797 A1* | 4/2020 | Wang | H04W 72/1289 |
| 2020/0178279 A1* | 6/2020 | Frenne | H04W 72/1289 |

FOREIGN PATENT DOCUMENTS

| | | |
|---|---|---|
| EP | 2 883 325 | 6/2015 |
| EP | 3 557 787 | 10/2019 |
| KR | 1020140099238 | 8/2014 |
| WO | WO 2011/115421 | 9/2011 |
| WO | WO 2014/028346 | 2/2014 |
| WO | WO 2017/188769 | 11/2017 |

OTHER PUBLICATIONS

Kang et al., U.S. Appl. No. 62/554,586, Methods for configuring an RS for fine time/frequency tracking, Date: Sep. 6, 2017.*
Cha et al., U.S. Appl. No. 62/574,305, CSI-RS design for CSI acquisition, Date: Oct. 12, 2017.*
Samsung, "Issues on TRS", R1-1804369, 3GPP TSG RAN WG1 Meeting #92, Apr. 16-20, 2018, 3 pages.
European Search Report dated Oct. 26, 2020 issued in counterpart application No. 18879545.4-1205, 11 pages.
CATT, "General CSI Framework for CSI Acquisition and Beam Managment", R1-1717814, 3GPP TSG RAN WG1 Meeting #90bis, Oct. 9-13, 2017, 6 pages.
Qualcomm Incorporated, "Details of CSI Framework", R1-1713393, 3GPP TSG RAN WG1 #90, Aug. 21-25, 2017, 6 pages.
Huawei, HiSilicon, "Discussion on CSI Framework Design", R1-1706926, 3GPP TSG RAN WG1 Meeting #89, May 15-19, 2017, 9 pages.
International Search Report dated Mar. 8, 2019 issued in counterpart application No. PCT/KR2018/014001, 23 pages.
Korean Office Action dated Jan. 10, 2022 issued in counterpart application No. 10-2017-0154192, 6 pages.

* cited by examiner

FIG. 11
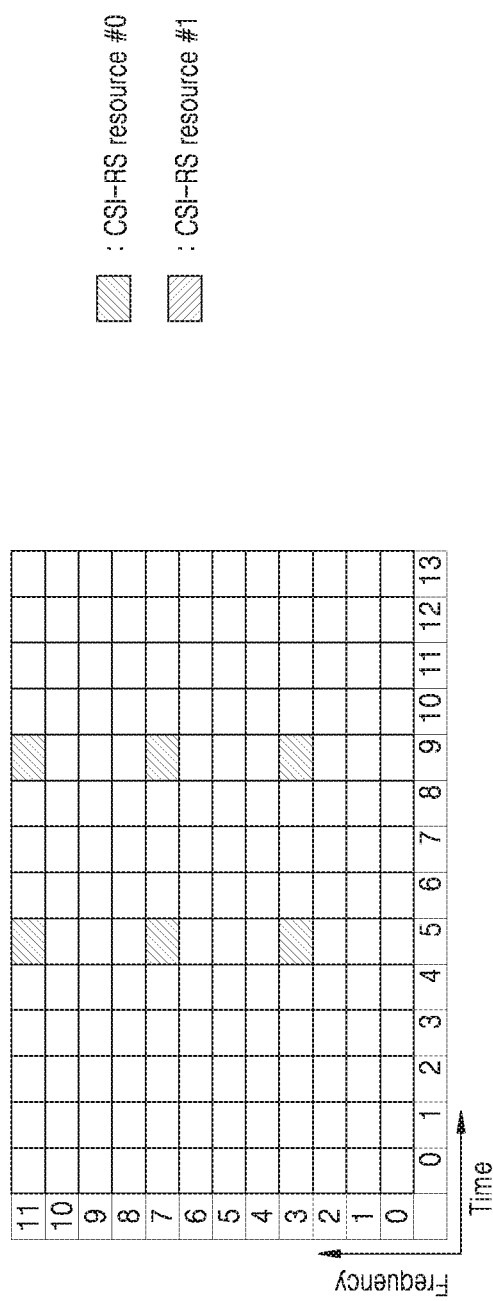
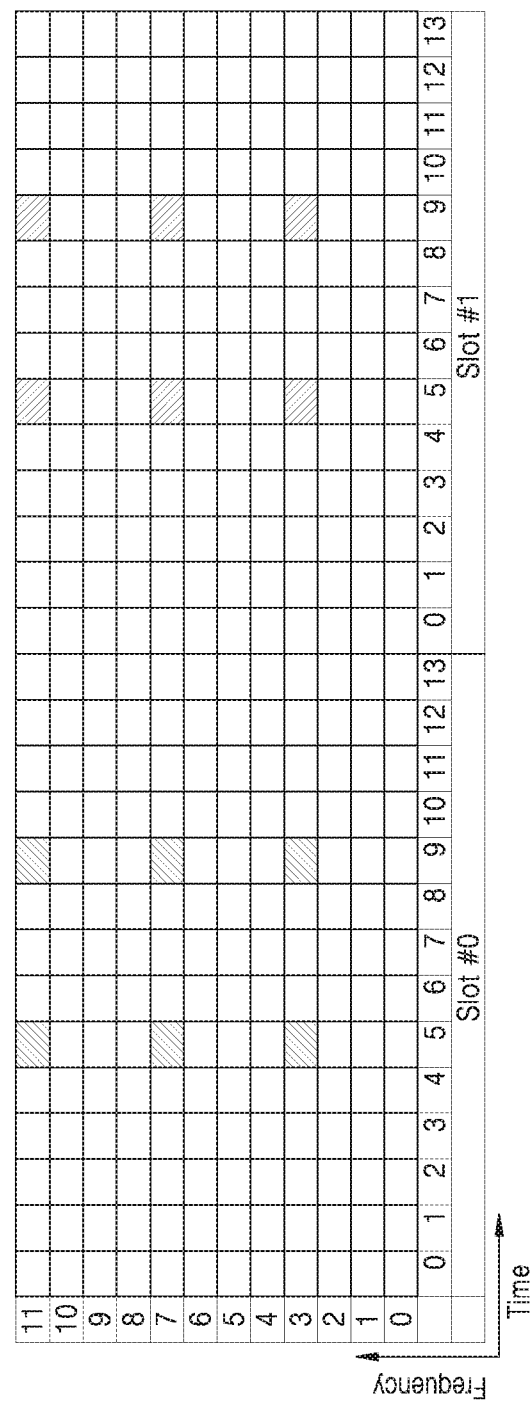

METHOD AND DEVICE FOR SETTING REFERENCE SIGNAL IN WIRELESS COMMUNICATION SYSTEM

PRIORITY

This application is a National Phase Entry of PCT International Application No. PCT/KR2018/014001 which was filed on Nov. 15, 2018, and claims priority to Korean Patent Application No. 10-2017-0154192, which was filed on Nov. 17, 2017, the content of each of which is incorporated herein by reference.

TECHNICAL FIELD

The disclosure relates to a wireless communication system, and more particularly, to a method and device for configuring a reference signal to smoothly provide a service.

BACKGROUND ART

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency millimeter-wave (mmWave) band (e.g., a 60-gigahertz (GHz) band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 3eG5G communication technology and IoT technology.

Because various services may be provided due to the aforementioned technical features and the development of wireless communication systems, methods for effectively providing these services are required.

DESCRIPTION OF EMBODIMENTS

Embodiments provide a method and device for configuring a reference signal to smoothly provide a service in a wireless communication system.

Solution to Problem

The disclosure provides a method of performing at least one operation based on a reference signal in a wireless communication system.

Advantageous Effects Of Disclosure

According to the disclosure, a reference signal may be efficiently configured in a wireless communication system.

BRIEF DESCRIPTION OF DRAWINGS

FIG. 11 illustrates 1-Port CSI-RS configuration, according to an embodiment.

BEST MODE

Figure 1:
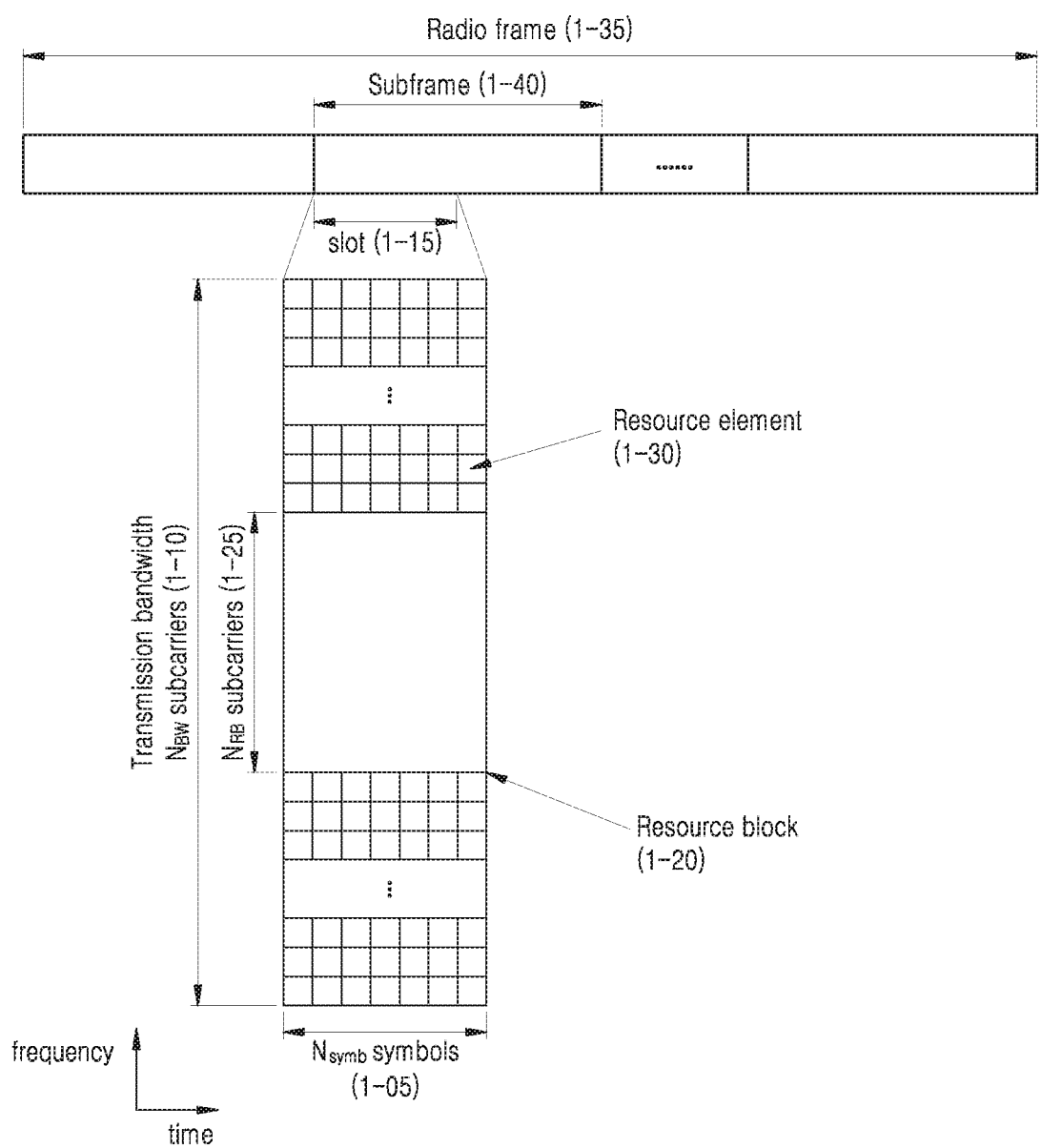
FIG. 1 is a diagram illustrating a time-frequency domain transmission structure of a long term evolution (LTE), LTE-advanced (LTE-A), new radio (NR), or similar system.

According to an embodiment of the disclosure, a method, performed by a user equipment (UE), of communicating based on reference signal configuration includes receiving, from a base station (BS), channel state information reference signal (CSI-RS) resource setting; determining whether CSI-RS reporting setting corresponding to the CSI-RS resource setting is allocated; and based on a result of the determining, determining whether to generate CSI.

The method may further include, when the CSI is not generated based on the result of the determining, performing at least one of a rate matching operation or a time/frequency tracking operation.

The performing of the at least one of the rate matching operation or the time/frequency tracking operation may include identifying at least one CSI-RS resource allocation pattern, based on the received CSI-RS resource setting, and performing the time/frequency tracking operation, based on the identified at least one CSI-RS resource allocation pattern.

The determining of whether the CSI-RS reporting setting corresponding to the CSI-RS resource setting is allocated may include, based on whether identification information about the CSI-RS reporting setting corresponding to the CSI-RS resource setting is provided, determining that the CSI-RS reporting setting corresponding to the CSI-RS resource setting is allocated, or based on information about measurement setting indicating a corresponding relation between the CSI-RS reporting setting and the CSI-RS resource setting, determining that the CSI-RS reporting setting corresponding to the CSI-RS resource setting is allocated.

The CSI-RS resource setting may include at least one resource set, and the at least one resource set may include resource information including at least one of type information about a RS, a transmission characteristic of the RS, and location information about a resource element (RE) at which the RS is to be transmitted.

The CSI-RS reporting setting may include at least one of reporting interval information, channel information used for reporting, and frequency and time information used for reporting.

According to an embodiment of the disclosure, a method, performed by a BS, of communicating based on reference signal configuration includes transmitting, to a UE, CSI-RS resource setting; determining an operation to be performed by the UE, by using at least one CSI-RS based on the CSI-RS resource setting; and based on a result of the determining, determining whether to allocate CSI-RS reporting setting corresponding to information about the CSI-RS resource setting.

The method may further include, based on a result of the determining whether to allocate, transmitting identification information about the CSI-RS reporting setting corresponding to the CSI-RS resource setting or transmitting information about measurement setting indicating a corresponding relation between the CSI-RS resource setting and the CSI-RS reporting setting.

According to an embodiment of the disclosure, a UE for performing communication based on reference signal configuration in a wireless communication system includes a transceiver; a memory storing a program for performing communication based on reference signal configuration; and a processor configured to receive, from a BS, CSI-RS resource setting, determine whether CSI-RS reporting setting corresponding to the CSI-RS resource setting is allocated, and based on a result of the determining, determine whether to generate CSI.

The processor may be further configured to, when the CSI is not generated based on the result of the determining, perform at least one of a rate matching operation or a time/frequency tracking operation.

The processor may be further configured to identify at least one CSI-RS resource allocation pattern, based on the received CSI-RS resource setting, and perform the time/frequency tracking operation, based on the identified at least one CSI-RS resource allocation pattern.

The processor may be further configured to, based on whether identification information about the CSI-RS reporting setting corresponding to the CSI-RS resource setting is provided, determine that the CSI-RS reporting setting corresponding to the CSI-RS resource setting is allocated, or based on information about measurement setting indicating a corresponding relation between the CSI-RS reporting setting and the CSI-RS resource setting, determine that the CSI-RS reporting setting corresponding to the CSI-RS resource setting is allocated.

The CSI-RS resource setting may include at least one resource set, and the at least one resource set may include resource information including at least one of type information about a RS, a transmission characteristic of the RS, and location information about a RE at which the RS is to be transmitted.

The CSI-RS reporting setting may include at least one of reporting interval information, channel information used for reporting, and frequency and time information used for reporting.

According to an embodiment of the disclosure, a BS for performing communication based on reference signal configuration in a wireless communication system includes a transceiver; a memory storing a program for performing communication based on reference signal configuration; and a processor configured to transmit, to a UE, CSI-RS resource setting, determine an operation to be performed by the UE, by using at least one CSI-RS based on the CSI-RS resource setting, and based on a result of the determining, determine whether to allocate CSI-RS reporting setting corresponding to information about the CSI-RS resource setting.

MODE OF DISCLOSURE

Embodiments of the disclosure will now be described more fully with reference to the accompanying drawings.

In the following description of embodiments, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in embodiments, refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, according to an embodiment, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, according to an embodiment, a "unit" may include one or more processors.

Hereinafter, operation principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms should be understood based on the entire description of the present specification. Hereinafter, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a UE, a mobile station (MS), a cellular phone, a smartphone, a computer, or a multimedia system capable of performing communication functions. However, the disclosure is not limited to the aforementioned examples.

Hereinafter, the disclosure provides a technology by which the terminal receives broadcasting information from the BS in a wireless communication system. The disclosure relates to a communication method and system for converging between a 5G communication system and an Internet of things (IoT) technology, the 5G communication system supporting a higher data rate after a 4G system. The disclosure is applicable to intelligent services (e.g., smart home, smart building, smart city, smart car or connected car, healthcare, digital education, retail trade, security, and safety services) based on 5G communication technologies and IoT-related technologies.

In the following descriptions, terms referring to broadcast information, terms referring to control information, terms related to communication coverage, terms referring to state changes (e.g., events), terms referring to network entities, terms referring to messages, terms referring to components of an apparatus, and the like are illustrated for convenience of descriptions. Thus, the disclosure is not limited to the terms described below and other terms having equivalent technical meanings may be used.

Hereinafter, for convenience of descriptions, some of terms and names defined in the $3^{rd}$ generation partnership project long term evolution (3GPP LTE) standards may be used. However, the disclosure is not limited to the terms and names and is equally applicable to systems according to other standards.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an evolved Node B (eNB) or a base station (BS)), and the DL refers to a radio link for transmitting data or a control signal from the base station to the terminal. The above-described multiple access schemes identify data or control information of different users in a manner that time-frequency resources for carrying the data or control information of the users are allocated and managed not to overlap each other, that is, to achieve orthogonality therebetween.

As post-LTE systems, 5G systems need to support services capable of reflecting and satisfying various requirements of users, service providers, and the like. Services considered for the 5G systems include enhanced mobile broadband (eMBB), massive machine-type communication (mMTC), ultra-reliability low-latency communication (URLLC) services, or the like.

According to an embodiment, the eMBB aims to provide an improved data rate than a data rate supported by the existing LTE, LTE-A, or LTE-Pro. For example, in a 5G communication system, the eMBB should be able to provide a peak data rate of 20 Gbps in a DL and a peak data rate of 10 Gbps in an UL at one BS. Simultaneously, it is necessary to provide an increased user-perceived data rate of a terminal. In order to satisfy such requirements, there is a need for an improvement in transmission/reception technology including an improved multiple-input multiple-output (MIMO) transmission technology. Also, the data rate required in the 5G communication system may be satisfied by using a frequency bandwidth wider than 20 MHz in the 3 GHz to 6 GHz or 6 GHz or more frequency band, instead of the 2 GHz band used by the current LTE.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced cost of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication systems. The terminal supporting the mMTC should be configured as a low-cost terminal and may require a very long battery life time because it is difficult to frequently replace the battery of the terminal.

Lastly, the URLLC refers to cellular-based wireless communication services used for mission-critical purposes, and should provide communications providing ultra-low latency and ultra reliability, as services for remote control of robots or machinery, industrial automation, unmanned aerial vehicles, remote health care, emergency alerts, and the like. For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a transmit time interval (TTI) smaller than other services and simultaneously has a design requirement for allocating wide resources in a frequency band. However, the above-described mMTC, URLLC, and eMBB are merely examples of different service types, and the service types to which the disclosure is applied are not limited thereto.

The above-described services considered in the 5G communication systems should be provided in a converged manner based on one framework. That is, for efficient resource management and control, respective services may be integrated, controlled, and transmitted as one system rather than the services operate independently.

Also, although embodiments of the disclosure will be described below by using an LTE, LTE-A, LTE Pro, or NR system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art. Hereinafter, a frame structure of LTE, LTE-A, and 5G systems will now be described with reference to the accompanying drawings, and a design concept of the 5G system will also be described.

FIG. 1 is a diagram illustrating a time-frequency domain transmission structure of an LTE, LTE-A, NR, or similar system.

FIG. 1 is a diagram illustrating a basic structure of a time-frequency resource domain that is a radio resource domain over which data or a control channel of LTE, LTE-A, and NR systems is transmitted, the LTE, LTE-A, and NR systems being based on a cyclic prefix (CP)-OFDM or SC-FDMA waveform.

Referring to FIG. 1, the horizontal axis represents a time domain and the vertical axis represents a frequency domain. A UL may refer to a radio link for transmitting data or a control signal from a UE to a BS, and a DL may refer to a radio link for transmitting data or a control signal from the base station to the UE.

A minimum transmission unit in the time domain of the LTE, LTE-A, and 5G systems may be an OFDM symbol or an SC-FDMA symbol, and $N_{symb}$ symbols 1-05 may be gathered to constitute one slot 1-15. In the LTE and LTE-A systems, two slots each including $N_{symb}$=7 symbols may be gathered to constitute one subframe 1-40. According to an embodiment, the 5G system may support a slot structure where two slot types of a slot and a mini-slot (or a non-slot) are provided. $N_{symb}$ of the slot in the 5G system may have a value from among 7 or 14, and $N_{symb}$ of the mini-slot in the 5G system may have a value from among 1, 2, 3, 4, 5, 6, or 7. In the LTE and LTE-A systems, a length of the slot is fixed as 0.5 ms and a length of the subframe is fixed as 1.0 ms, but, in the 5G system, a length of the slot or a length of the mini-slot may be flexibly changed according to subcarrier spacing. In the LTE and LTE-A systems, a radio frame 1-35 is a time-domain unit including 10 subframes. In the LTE and LTE-A systems, a minimum transmission unit in a frequency domain is a subcarrier of 15 kHz (subcarrier spacing=15 kHz), and a bandwidth of an entire system transmission bandwidth is composed of $N_{BW}$ subcarriers 1-10. A flexible and extensible frame structure of the 5G system will be described at a later time.

A basic unit of resources in the time-frequency domain may be a resource element (RE) 1-30 and may be defined as an OFDM symbol or SC-FDMA symbol index and a sub-carrier index. A resource block (RB) 1-20 or a physical resource block (PRB) may be defined as $N_{symb}$ consecutive OFDM symbols or SC-FDMA symbols 1-05 in the time domain and $N_{RB}$ consecutive subcarriers 1-25 in the frequency domain. Therefore, one RB 1-20 is composed of $N_{symb} \times N_{RB}$ REs 1-30. In the LTE and LTE-A systems, data is mapped to a RB unit, and a BS performs scheduling, on a certain UE, in RB-pair units constituting one subframe. $N_{symb}$ denoting the number of SC-FDMA symbols or the number of OFDM symbols is determined according to a length of a CP added to every symbol so as to prevent interference between symbols. For example, when a normal CP is applied, $N_{symb}$=7, and when an extended CP is applied, $N_{symb}$=6. Compared to the general CP, the extended CP is applied to a system for a relatively large radio transmission distance, such that orthogonality between symbols can be maintained.

According to an embodiment, subcarrier spacing, a CP length, and the like are essential information for OFDM transmission and reception, and only when a BS and a UE identify the information as mutually-common values, transmission and reception may be smoothly performed.

The aforementioned frame structure of the LTE and LTE-A systems is designed based on general voice/data communication, but has a limit to extension with respect to satisfaction of various services and requirements, like the 5G system. Therefore, for the 5G system, it is necessary to flexibly define and operate the frame structure, in consideration of the various services and the requirements.

Figure 2:
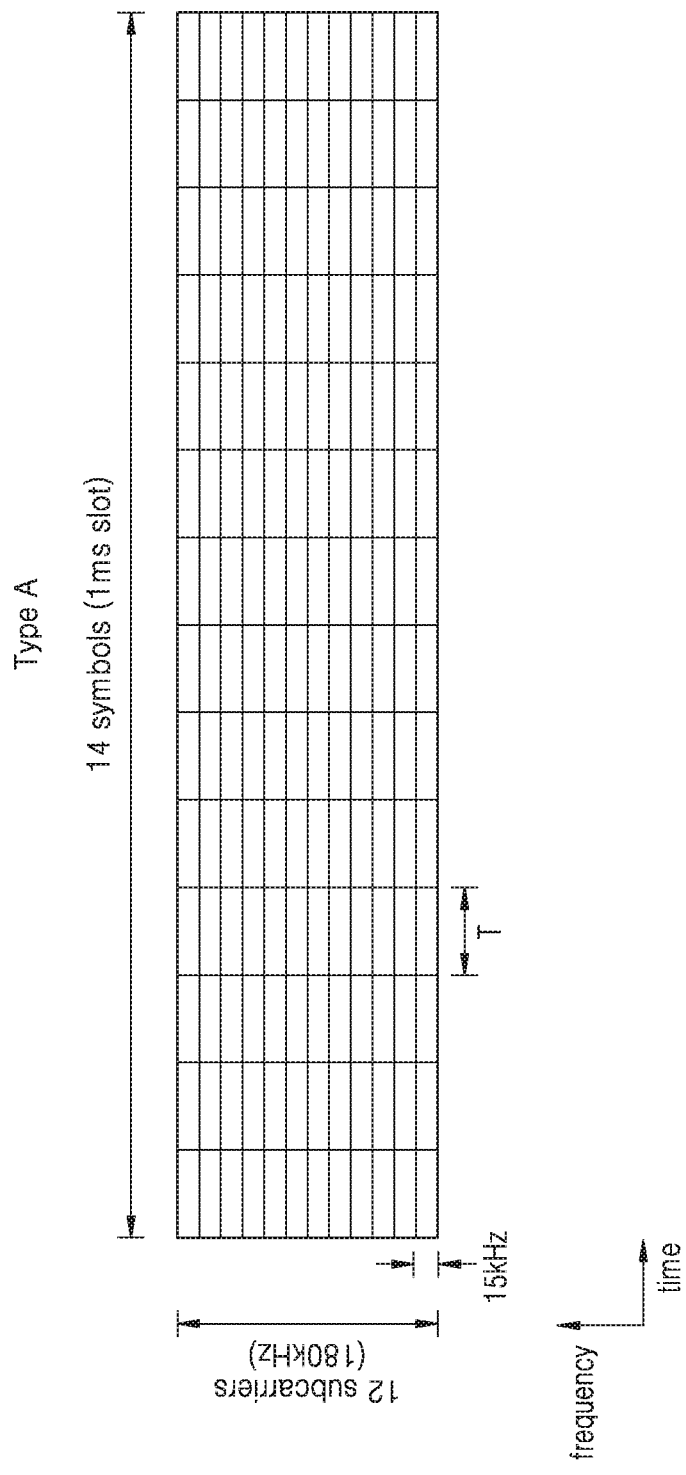
FIGS. 2 to 4 illustrate an extended frame structure, according to an embodiment.
Figure 3:
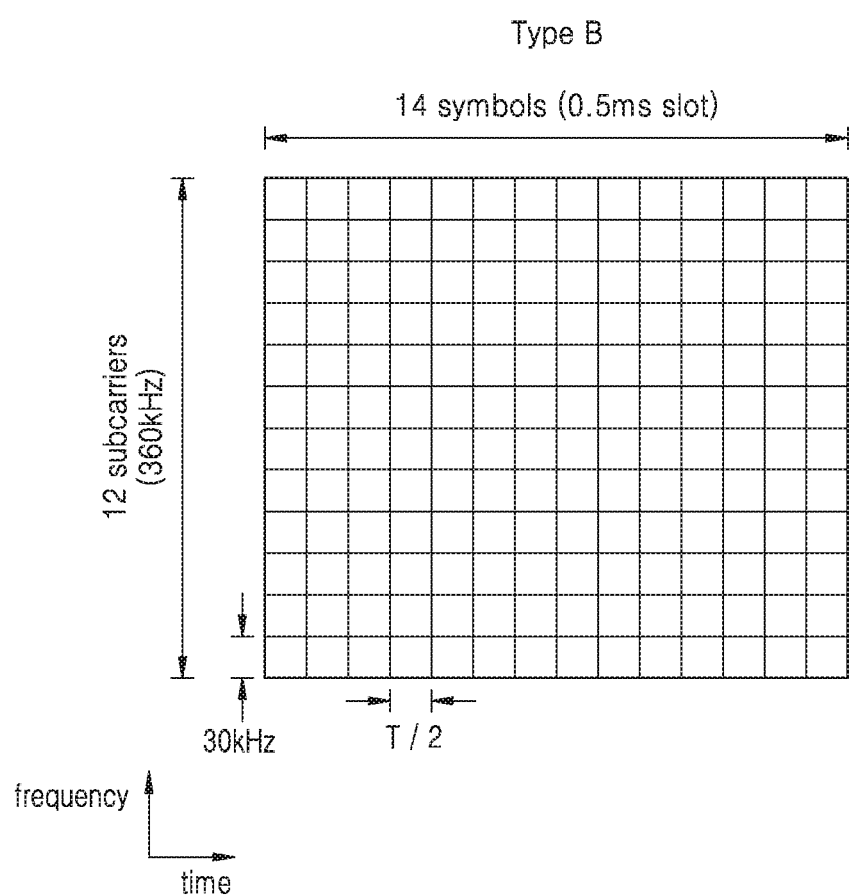
Figure 4:
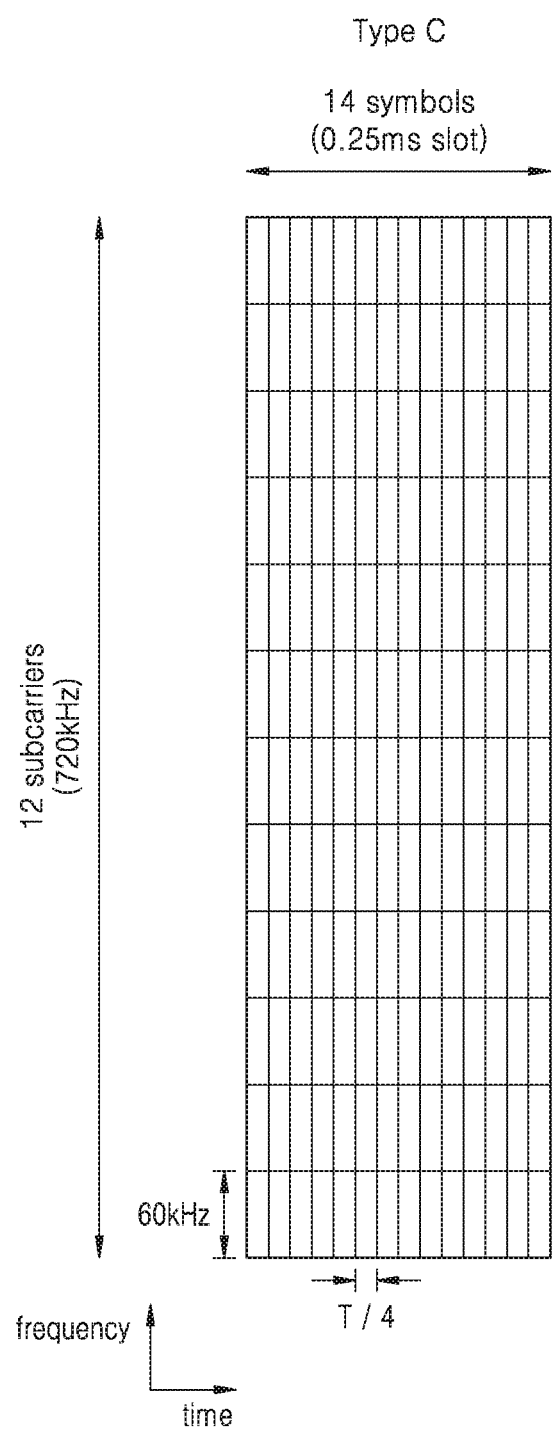

FIGS. 2 to 4 illustrate an extended frame structure, according to an embodiment.

Examples of FIGS. 2, 3, and 4 may each correspond to an essential parameter set defining an extensible frame structure, and may include subcarrier spacing, a CP length, a slot length, and the like. In the 5G system, a basic time unit for performing scheduling may be a slot.

In the early stage of the 5G system, a coexisting or dual mode of the 5G system and legacy LTE/LTE-A systems is expected. By doing so, the legacy LTE/LTE-A systems provide a stable system operation, and the 5G system may provide an enhanced service. Therefore, it is requested for an extensible frame structure of the 5G system to include a frame structure or an essential parameter set of the LTE/LTE-A systems. Referring to FIG. 2, a frame structure of the 5G system, which is equal to the frame structure of the LTE/LTE-A systems, or an essential parameter set is shown. Frame structure type A shown in FIG. 2 corresponds to a structure where subcarrier spacing is 15 kHz, 14 symbols constitute 1-ms slot, and a PRB is composed of 12 subcarriers (=80 kHz=12×15 kHz).

Referring to FIG. 3, frame structure type B shown in FIG. 3 corresponds to a structure where subcarrier spacing is 30 kHz, 14 symbols constitute 0.5-ms slot, and a PRB is composed of 12 subcarriers (=360 kHz=12×30 kHz). That is, compared to Frame structure type A, subcarrier spacing and a size of a PRB are increased twice, and a slot length and a symbol length are decreased twice.

Referring to FIG. 4, frame structure type C shown in FIG. 4 corresponds to a structure where subcarrier spacing is 60 kHz, 14 symbols constitute 0.25-ms slot, and a PRB is composed of 12 subcarriers (=720 kHz=12×60 kHz). That is, compared to Frame structure type A, subcarrier spacing and a size of a PRB are increased four times, and a slot length and a symbol length are decreased four times.

That is, when the frame structure type is normalized, subcarrier spacing, a CP length, a slot length, and the like that are an essential parameter set have an integer-multiple relation therebetween according to each of frame structure types, such that high extensibility may be provided. Also, to indicate a reference time unit unrelated to the frame structure type, a subframe having a fixed length of 1 ms may be defined. Therefore, in Frame structure type A, one subframe is composed of one slot, in Frame structure type B, one subframe is composed of two slots, and in Frame structure type C, one subframe is composed of four slots. However, it is obvious that an extensible frame structure is not limited to the aforementioned Frame structure type A, B, or C, may be applied to other subcarrier spacing such as 120 kHz, 240 kHz, or the like, and may have a different structure.

According to an embodiment, the aforementioned frame structure type may be applied to various scenarios. In terms of a cell size, when a CP length is increased, a larger cell can be supported, such that Frame structure type A may support a relatively large call, compared to Frame structure types B and C. In terms of an operating frequency band, when subcarrier spacing is increased, recovery from phase noise of a high frequency band becomes easy, such that Frame structure type C may support a relatively high operating frequency, compared to Frame structure types A and B. In terms of a service, when a subframe length is decreased, a ultra low latency service such as URLLC is further supported, such that Frame structure type C is appropriate for a URLLC service, compared to Frame structure types A and B.

Also, a plurality of frame structure types may be multiplexed in one system and may be operated in an integrated manner.

Figure 5:
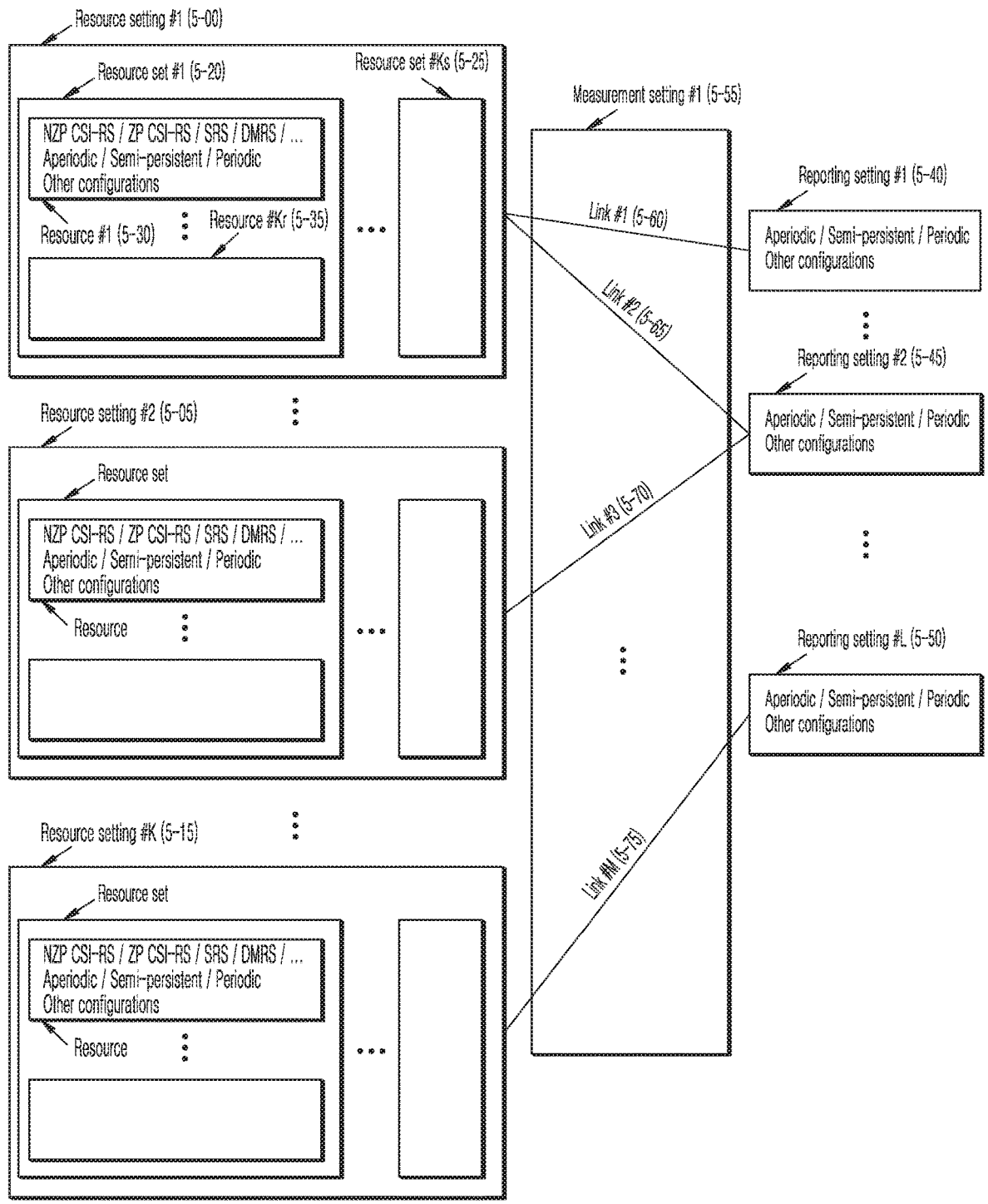
FIG. 5 illustrates a channel state information framework, according to an embodiment.

FIG. 5 illustrates a channel state information framework, according to an embodiment.

Referring to FIG. 5, FIG. 5 illustrates a channel state information (CSI) framework of a NR system. The CSI framework of a NR of FIG. 5 is composed of three elements including resource setting, reporting setting, and measurement setting.

According to an embodiment, resource setting is an element including information related to a reference signal (RS), and a BS may configure one or more resource settings 5-00, 5-05, and 5-15 to a UE. Each of resource settings may include one or more resource sets 5-20 and 5-25, and each resource set may include one or more resources 5-30 and 5-35. The resources 5-30 and 5-35 may each include particular information about the RS, e.g., Non-Zero Power CSI-RS (NZP CSI-RS), Zero Power CSI-RS (ZP CSI-RS), Sounding RS (SRS), Demodulation RS (DMRS), or the like that are RS type/type information, information about RS transmission characteristic such as aperiodic, semi-persistent, periodic, or the like, information about a RE location at which the RS is to be transmitted, and the like.

According to an embodiment, reporting setting is an element including information related to a CSI reporting scheme, and the BS may configure one or more reporting settings 5-40, 5-45, and 5-50 to the UE. In this regard, each of reporting settings may include information about transmission characteristic such as aperiodic, semi-persistent, periodic, or the like, and frequency/time location information about a channel (whether it is a Physical Uplink Shared Channel (PUSCH) or a Physical Uplink Control Channel (PUCCH)) or a resource over which reporting is to be transmitted. In this regard, a RS the UE refers to in each CSI reporting may be configured via measurement setting 5-55.

According to an embodiment, measurement setting may include configurations of one or more links 5-60, 5-65, 5-70, and 5-75 that each connects one resource setting with one reporting setting. When the link 5-60 connects the reporting setting 5-40 with the resource setting 5-00, the resource setting 5-00 may be used in channel measurement. When the links 5-65 and 5-70 connect one reporting setting 5-45 with two resource settings 5-00 and 5-05, one resource setting from among two resource settings 5-00 and 5-05 may be used in channel measurement, and the other resource setting may be used in interference measurement.

NZP CSI-RS may be a most representative RS configured in resource setting, and each CSI-RS resource configuration configured by an upper-level layer may include at least a plurality of items of particular configuration information described below. However, the disclosure is not limited to examples below.

NZP-CSI-RS-Resource ConfigID: ID of corresponding CSI-RS resource configurations NrofPorts: the number of CSI-RS ports included a corresponding CSI-RS resource CSI-RS-timeConfig: a transmission interval and a slot offset of a corresponding CSI-RS resource CSI-RS-ResourceMapping: a location of an OFDM symbol in a slot and a location of subcarrier in a PRB of a corresponding CSI-RS resource CSI-RS-Density: frequency density of a corresponding CSI-RS CDMType: a CDM length and a CDM RE pattern of a corresponding CSI-RS CSI-RS-FreqBand: a transmission bandwidth and a start location of a corresponding CSI-RS Pc: a ratio of PDSCH EPRE (Energy Per RE) to NZP CSI-RS EPRE Pc-SS: a ratio of SS/PBCH block EPRE to NZP CSI-RS EPRE CSI-RS-ResourceRep: interoperation between NZP CSI-RS resources belonging to a resource set When CSI-RS-ResourceRep is 'ON', the UE may identify that same spatial domain transmission filter is applied to all NZP CSI-RS resources belonging to the resource set (that is, the UE can assume that the BS has used a same transmission beam), and each of the NZP CSI-RS resources has same CSI-RS port number and periodicity. When CSI-RS-ResourceRep is 'OFF', the UE cannot assume that same spatial domain transmission filter is applied to all NZP CSI-RS resources belonging to the resource set (that is, the UE cannot assume that the BS has used a same transmission beam), and cannot identify whether each of the NZP CSI-RS resources has same CSI-RS port number and periodicity.

According to an embodiment, in a NR, one of {1, 2, 4, 8, 12, 16, 24, 32} may be configured as a CSI-RS port number to one CSI-RS resource, and may support different degrees of freedom with respect to configuration, according to a CSI-RS port number configured to a CSI-RS resource. Table 1 shows CSI-RS density, CSI-RS OFDM symbol number (N), a frequency-axis RE number Y and a time-axis RE number Z in a CSI-RS component RE pattern, and CDM length and type which are configurable according to a CSI-RS port number X.

According to an embodiment, the CSI-RS component RE pattern may be composed of a total of YZ REs that are Y REs close to a frequency axis and Z REs close to a time axis and are basic units constituting a CSI-RS resource. Referring to Table 1, the NR supports different degrees of freedom with respect to configuration, according to the number of CSI-RS ports configured to a CSI-RS resource. When one port, a RE may be configured without a limit to subcarriers in a PRB and may be allocated a CSI-RS RE location based on a 12-bit bitmap (6-00). When {2, 4, 8, 12, 16, 24, 32} ports and Y=2, a RE may be configured for every two subcarriers in a PRB and may be allocated a CSI-RS RE location based on a 6-bit bitmap (6-05). When 4 ports and Y=4, a RE may be configured for every four subcarriers in a PRB and may be allocated a CSI-RS RE location based on a 3-bit bitmap (6-10). Similarly, a time-axis RE location may be configured based on a 14-bit bitmap. In this regard, a length of a bitmap may vary according to Z value in Table 1, as the frequency location is specified, but a principle is similar to the aforementioned descriptions and thus detailed descriptions thereof are not provided here.

TABLE 1

Parameters for NR CSI-RS

| X | Density [RE/RB/port] | N | (Y, Z) | CDM |
|---|---|---|---|---|
| 1 | >1, 1, ½ | 1 | N.A. | No CDM |
| 2 | 1, ½ | 1 | (2, 1) | FD-CDM2 |
| 4 | 1 | 2 | (2, 2) | FD-CDM2 |
| 4 | 1 | 1 | (4, 1) | FD-CDM2 |
| 8 | 1 | 1 | (2, 1) | FD-CDM2 |
| 8 | 1 | 2 | (2, 2) | FD-CDM2, CDM4 (FD2, TD2) |
| 12 | 1 | 1 | (2, 1) | FD-CDM2 |
| 12 | 1 | 2 | (2, 2) | CDM4 (FD2, D2) |
| 16 | 1, ½ | 2 | (2, 2) | FD-CDM2, CDM4 (FD2, TD2) |
| 24 | 1, ½ | 4 | (2, 2) | FD-CDM2, CDM4 (FD2, TD2), CDM8 (FD2, TD4) |
| 32 | 1, ½ | 4 | (2, 2) | FD-CDM2, CDM4 (FD2, TD2), CDM8 (FD2, TD4) |

Figure 6:
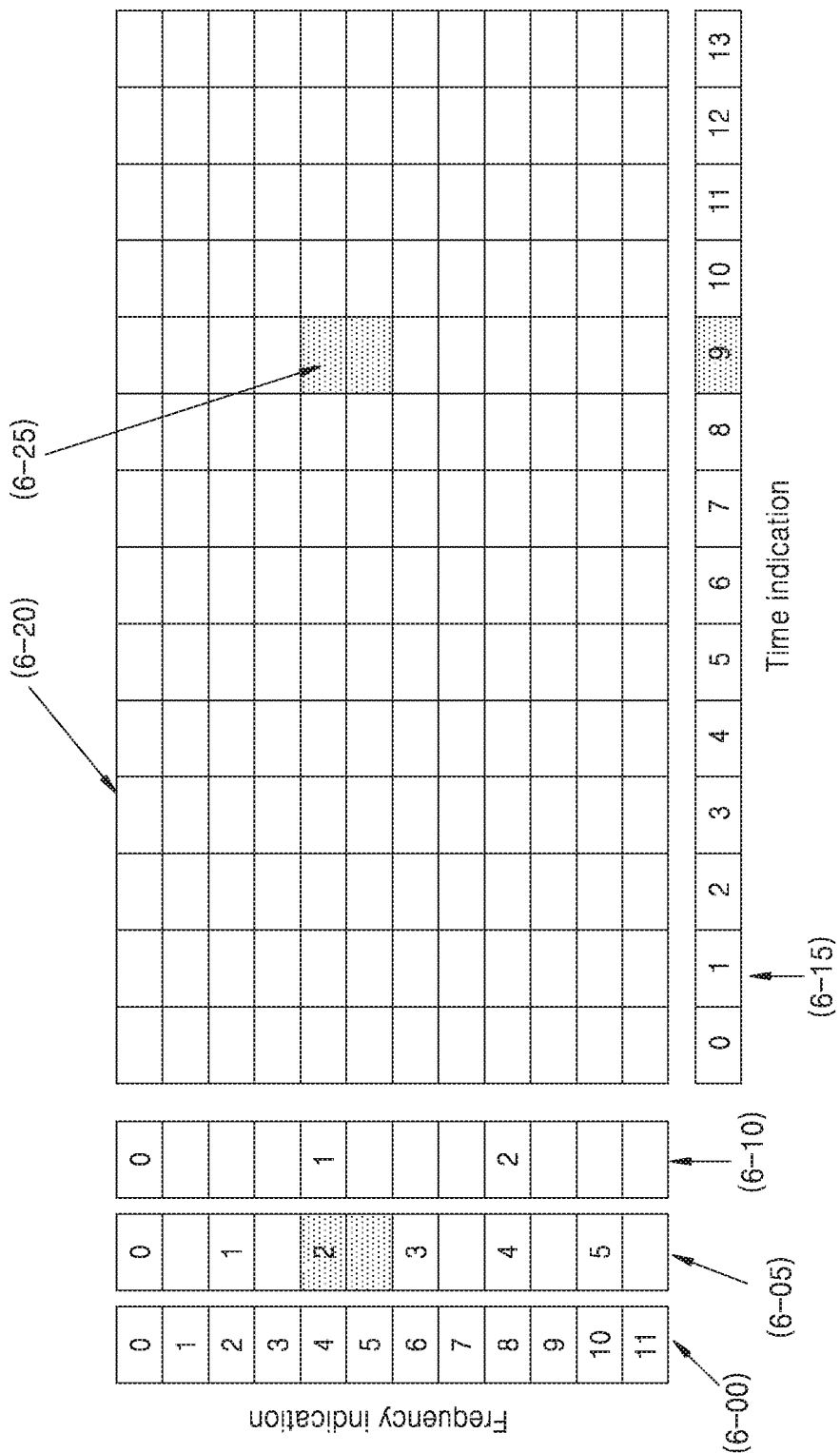
FIG. 6 illustrates how a channel state information-reference signal resource element (CSI-RS RE) is specified due to CSI-reference signal (CSI-RS) resource mapping, according to an embodiment.

FIG. 6 illustrates how a CSI-RS RE is specified due to CSI-RS resource mapping, according to an embodiment.

Referring to FIG. 6, an example is shown, in which a CSI-RS RE is specified due to CSI-RS-ResourceMapping configured by an upper-level layer. When configured as X=2 ports, the BS specifies a frequency-axis RE location according to (6-05). When a subcarrier location in a frequency axis is specified according to 2 of (6-05), and an OFDM symbol location in a time axis is specified according to 9 of (6-15), the UE may identify, based on the specification, that a CSI-RS is transmitted at a RE location of (6-25) in a PRB 6-20.

As described above, the NR may provide a very flexible CSI-RS configuring scheme, and by using the scheme, various functions including rate matching, time/frequency tracking, and the like as well as CSI measurement via a CSI-RS may be provided to the UE. Hereinafter, methods therefor will now be described in detail.

<First Embodiment: Resource Setting, Reporting Setting, Measurement Setting Configurations for Rate Matching and Tracking>

As in the descriptions above, in the NR, the BS may configure a CSI-RS to the UE so as to provide a function such as rate matching or time/frequency tracking, other than CSI measurement. When CSI-RSs configured for functions other than the CSI measurement are configured for reporting setting, a UE power may be consumed for generation of unnecessary CSI or a UL resource may be wasted for unnecessary CSI reporting.

Figure 7:
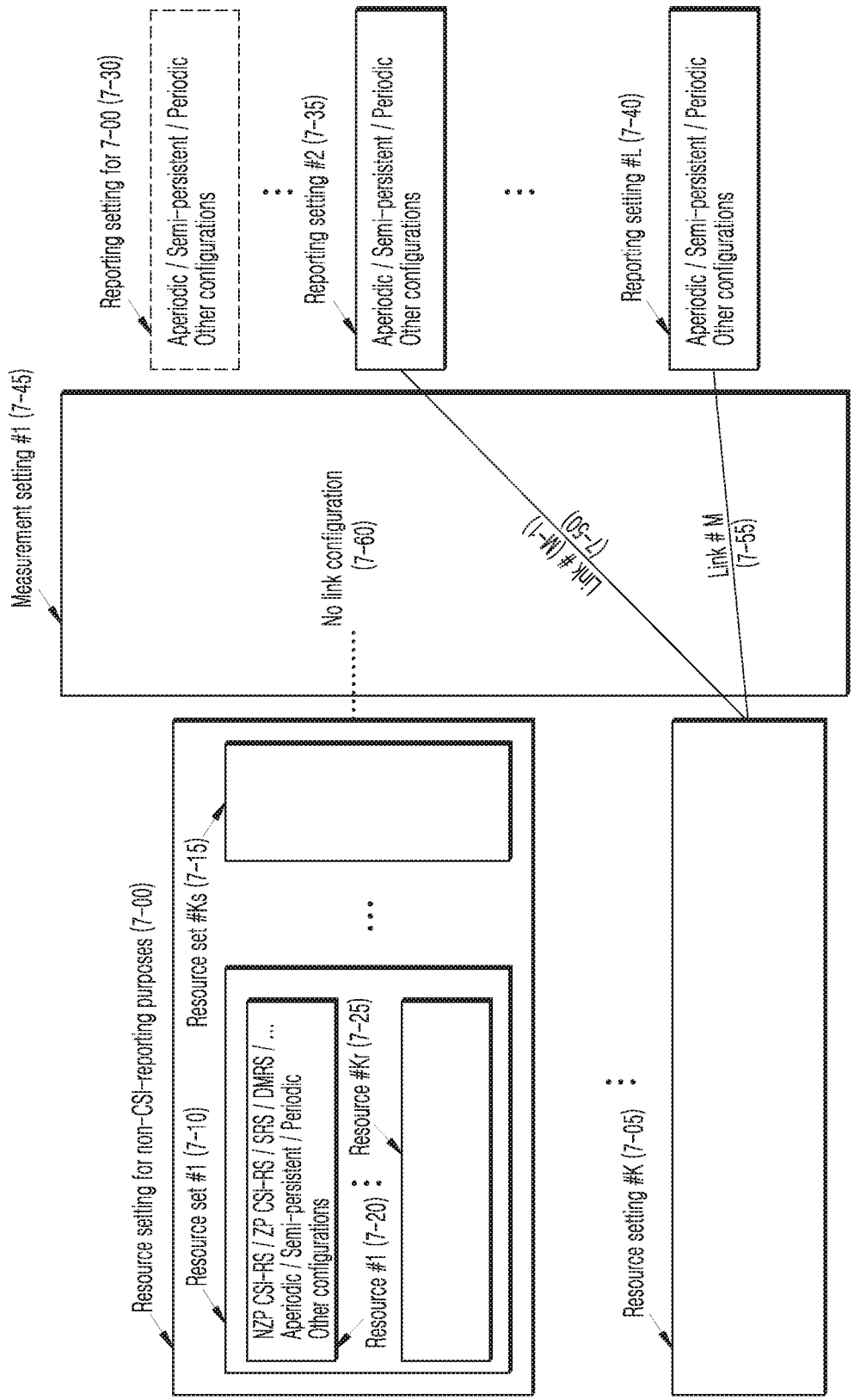
FIG. 7 illustrates configuration of resource setting, reporting setting, and measurement setting for configuration of a CSI-RS, according to an embodiment.

FIG. 7 illustrates configuration of resource setting, reporting setting, and measurement setting for configuration of a CSI-RS, according to an embodiment. Referring to FIG. 7, FIG. 7 illustrates an example of configuration of resource setting, reporting setting, and measurement setting for efficiently configuring a CSI-RS dedicated to rate matching or time/frequency tracking.

According to an embodiment, a CSI-RS for providing a function other than CSI reporting may be configured via resource setting 7-00 composed of one or more resource sets 7-10 and 7-15 including one or more resources 7-20 and 7-25. In this regard, the BS may not add a link to measurement setting 7-45, the link corresponding to the resource setting 7-00 (7-60), or may not configure reporting setting 7-30 corresponding to the resource setting 7-00. The UE may identify a difference between the resource setting 7-00 and resource setting 7-05 having links 7-50 and 7-55 and reporting settings 7-35 and 7-40, and may perform only rate matching instead of channel estimation for CSI generation, or when required, may perform only time/frequency tracking, thereby saving power consumption. Also, the BS may save a UL resource for 7-30.

<Second Embodiment: CSI-RS Configuration for LTE CRS>

In the second embodiment, a method of configuring a LTE cell-specific reference signal (LTE CRS) via a NR CSI-RS based on measurement setting and reporting setting configurations of the first embodiment will now be described. By doing so, it is possible for a BS to indicate a NR UE to 1) estimate a channel by using the LTE CRS or 2) to perform rate matching on a LTE CRS RE. In a case of the purpose for 1), the BS may skip a part of the present embodiment, the part corresponding to the first embodiment, and may normally apply measurement setting and reporting setting as described with reference to FIG. 5.

Figure 8:
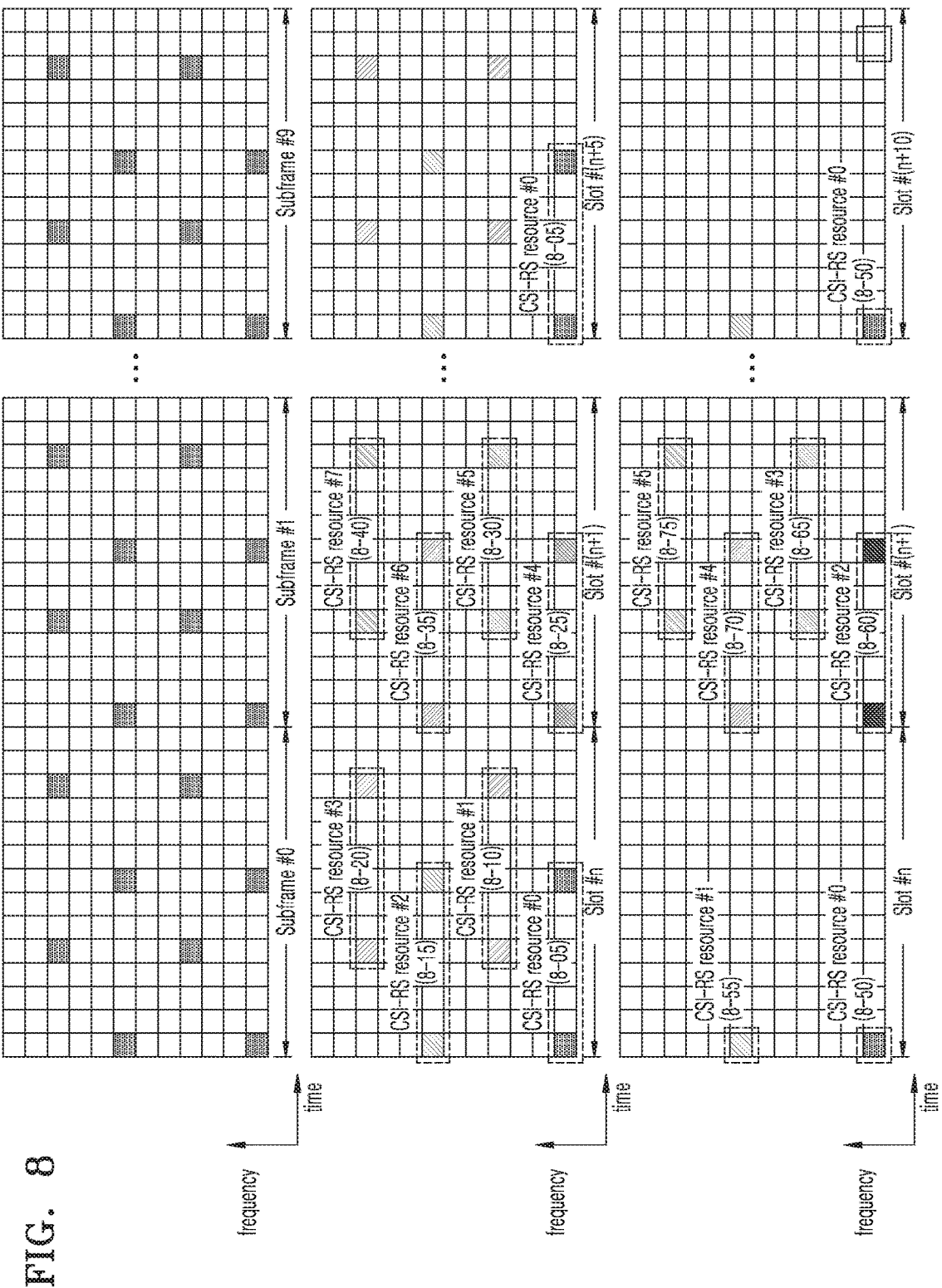
FIG. 8 illustrates LTE CRS RE pattern indication via CSI-RS configuration, according to an embodiment.

FIG. 8 illustrates LTE CRS RE pattern indication via CSI-RS configuration, according to an embodiment.

According to an embodiment, a LTE CRS RE pattern 8-00 may mean a LTE CRS pattern of 1 radio frame, i.e., 10 subframes. In a LTE UE, it is assumed that, when some subframes are specified as MBSFN subframes due to upper layer signaling, a CRS is transmitted at only a first OFDM symbol in a corresponding subframe.

When the BS assumes a LTE normal subframe and indicates NR CSI-RS configuration to the NR UE so as to cover a LTE CRS, the BS may configure four 1-port CSI-RS resources #0 to #3 8-05, 8-10, 8-15, and 8-20 in $n^{th}$ slot. In this regard, CSI-RS resources #0 to #3 8-05, 8-10, 8-15, and 8-20 may be configured at frequency density of 1 RE/RB/port. CSI-RS resources #0 and #2 8-05 and 8-15 may be configured to be located in first and eighth OFDM symbols, and CSI-RS resources #1 and #3 8-10 and 8-20 may be configured to be located in fifth and twelfth OFDM symbols. However, the disclosure is not limited thereto.

According to an embodiment, subcarrier locations of CSI-RS resources #0 to #3 8-05, 8-10, 8-15, and 8-20 may be determined, in an assumption of the CRS RE pattern 8-00 of FIG. 8, and when a subcarrier offset of the CRS is changed, it is obvious that the subcarrier locations may be appropriately changed according to the change. To reduce upper layer signaling overhead necessary for NR CSI-RS configuration, the BS may fix an interval (or period) of each CSI-RS resource to be 5 slots, and in this case, a RE for a same resource is repeated at every $5^{th}$ slot (8-05). Similarly, the BS may configure, in $(n+1)^{th}$ slot, four 1-port CSI-RS resources #4 to #7 8-25, 8-30, 8-35, and 8-40 having a same 5-slot interval and a slot offset of one slot. Afterward, same configuration is repeated up to $(n+5)^{th}$ slot and thus a CRS pattern as the CRS RE pattern 8-00 of FIG. 8 may be completed.

When the BS indicates "the NR UE to 1) estimate a channel by using the LTE CRS", the BS may include all the 1-port CSI-RSs in a same resource set and may configure the CSI-RS-ResourceRep parameter as 'ON'. In this case, the UE assumes a same transmission beam with respect to all 1-port CSI-RSs, such that the UE may apply continuous channel estimation to time and frequency axes, similarly to CRS-based channel estimation. (When CSI-RS-ResourceRep parameter is 'OFF', the UE cannot assume continuity of a channel between CSI-RS resources)

When the BS attempts to cover a LTE CRS RE pattern by assuming LTE MBSFN subframe in some slots of the NR UE, the BS may use NR CSI-RS configuration different from the aforementioned one. When $n^{th}$ slot is used as LTE MBSFN subframe and $(n+1)^{th}$ slot is used as LTE normal subframe, two 1-port CSI-RS resources 8-50 and 8-55 may be configured in $n^{th}$ slot.

In this regard, CSI-RS resources #0 and #1 8-50 and 8-55 are configured at frequency density of 1 RE/RB/port and are configured to be located in a first OFDM symbol. Subcarrier locations of RS resources #0 and #1 8-50 and 8-55 may be determined, in an assumption of the CRS RE pattern 8-00 of FIG. 8. When a subcarrier offset of the CRS is changed, it is obvious that the subcarrier locations may be appropriately changed according to the change.

On the other hand, in a case of $(n+1)^{th}$ slot, four 1-port CSI-RS resources #2 to #5 8-60, 8-65, 8-70, and 8-75 may be configured. In this regard, CSI-RS resources #2 to #5 8-60, 8-65, 8-70, and 8-75 may be configured at frequency density of 1 RE/RB/port. CSI-RS resource #2 and #4 8-60 and 8-70 are configured to be located in first and eighth OFDM symbols and CSI-RS resource #3 and #5 8-65 and 8-75 are configured to be located in fifth and twelfth OFDM symbols. CSI-RS resource #2 to #5 8-60, 8-65, 8-70, and 8-75 may be determined, in an assumption of the CRS RE pattern 8-00 of FIG. 8, and when a subcarrier offset of the CRS is changed, it is obvious that the subcarrier locations may be appropriately changed according to the change.

In the present embodiment, the BS has to fix an interval of each CSI-RS resource to be 10 slots, in consideration of an interval of MBSFN subframe. That is, a RE for a same resource is repeated at every 10th slot (CSI-RS resource #0(8-50) of slot #(n+10)).

<Third Embodiment: CSI-RS Configuration for NR TRS>

In the NR, a tracking RS (TRS) may be configured for fine time/frequency tracking by the BS. The TRS may be transmitted at one (X=1) or two (X=2) consecutive slots at a particular interval such as 10 ms, 20 ms, or the like, and this may be called TRS burst.

In embodiments below, a TRS configuring method using a NR CSI-RS based on measurement setting and reporting setting configurations of the first embodiment will now be described.

Figure 9:
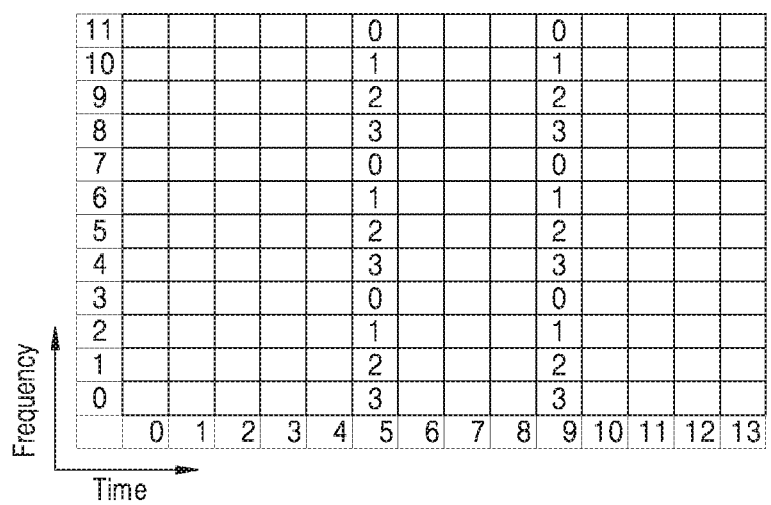
FIGS. 9 and 10 illustrate a tracking-RS (TRS) pattern, according to an embodiment.
Figure 10:
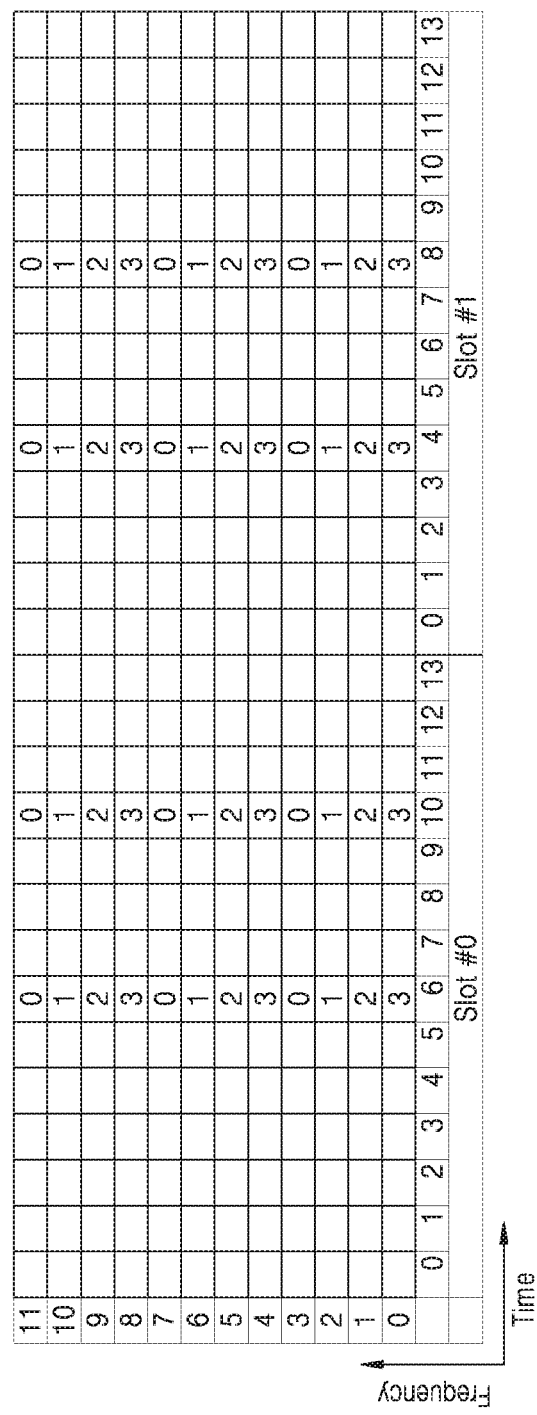

FIGS. 9 and 10 illustrate a TRS pattern, according to an embodiment.

Referring to FIGS. 9 and 10, examples of a TRS pattern when TRS burst is X=1 and X=2 are shown. As shown in FIGS. 9 and 10, a TRS may have frequency RE density of 3 RE/RB/port, and a RE may be repeated at every four subcarriers. (That is, one TRS port is transmitted at REs of 0, 1, 2, and 3 REs among TRS OFDM symbol REs shown in FIG. 9 or 10.) According to an embodiment, TRS may be transmitted at one of three OFDM symbol pairs of [{$5^{th}$, $9^{th}$}, {$6^{th}$, $10^{th}$}, {$7^{th}$, $11^{th}$}]. In FIGS. 9 and 10, locations of OFDM symbols are examples of TRS configuration, and actual transmission locations may be changed according to transmission by the BS.

FIG. 11 illustrates 1-Port CSI-RS configuration, according to an embodiment.

Referring to FIG. 11, FIG. 11 illustrates an example of 1-port CSI-RS configuration for covering TRS RE patterns of FIGS. 9 and 10. Referring to FIG. 11, the BS may configure one resource set to one resource setting and may configure maximum two CSI-RS resources thereto. In this regard, frequency density of a CSI-RS may be configured as 3 RE/RB/port. When using X=1 TRS burst, the BS may configure only CSI-RS resource #0, and when using X=2 TRS burst, the BS may configure both CSI-RS resources #0 and #1. When using X=2 TRS burst, the BS may configure the CSI-RS-ResourceRep parameter to be 'ON' such that the UE may perform continuous time/frequency tracking on all 1-port CSI-RSs, assuming a same transmission beam. As another example, when the CSI-RS resources are configured via a TRS, e.g., when a link of corresponding reporting setting or measurement setting is not configured, or when it is clearly configured, via a corresponding CSI-RS, that time/frequency tracking can be performed, it is possible to configure that all CSI-RS ports belonging to CSI-RS resources can be assumed as a same antenna port, regardless of ResourceRep parameter configuration with respect to each of the CSI-RS resources.

Figure 12:
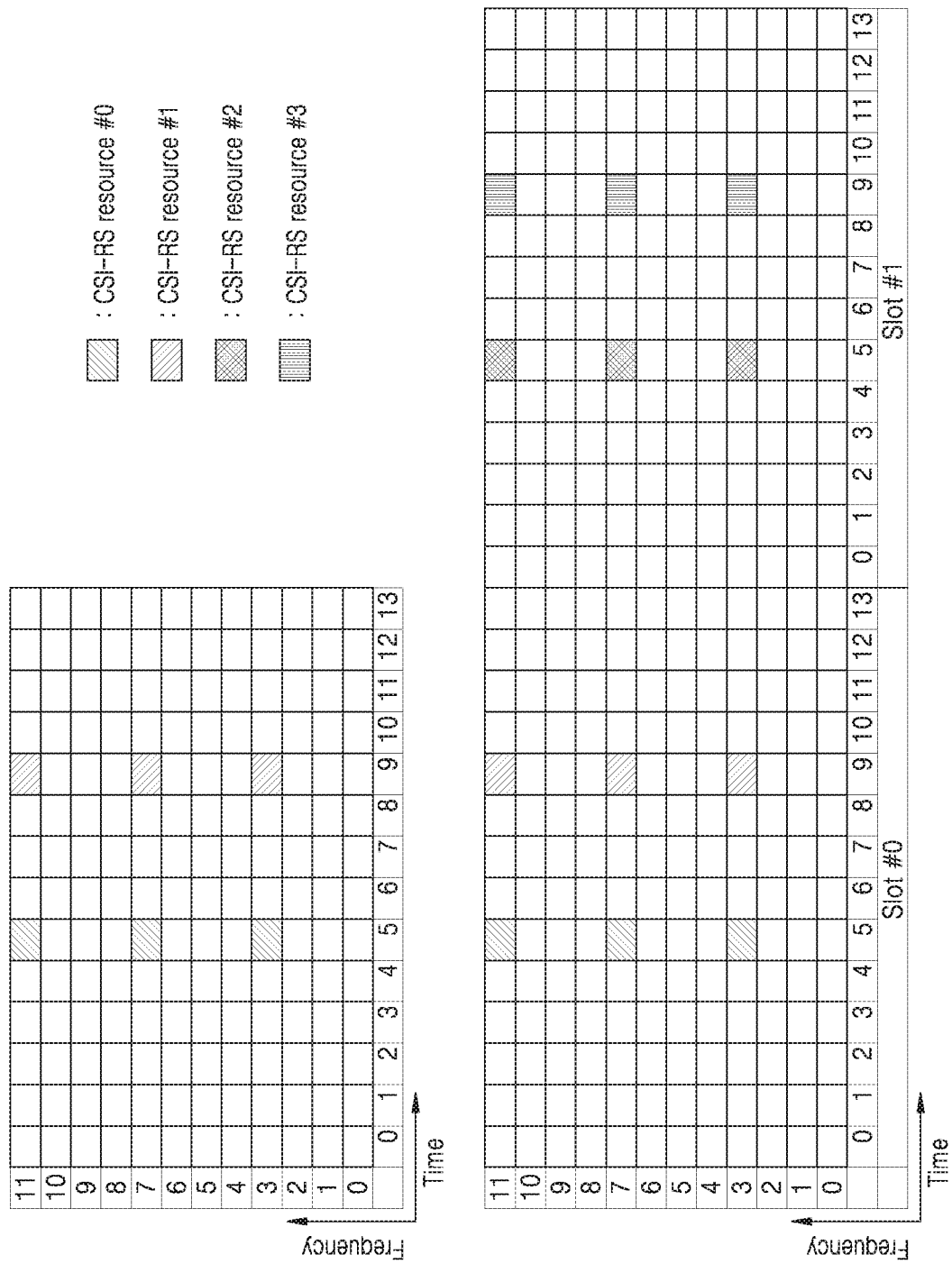
FIG. 12 illustrates 1-Port CSI-RS configuration, according to an embodiment.

FIG. 12 illustrates 1-Port CSI-RS configuration, according to an embodiment.

Referring to FIG. 12, FIG. 12 illustrates 1-port CSI-RS configuration for covering TRS RE patterns of FIGS. 9 and 10. Referring to FIG. 12, the BS may configure one resource set to one resource setting and may configure maximum four CSI-RS resources thereto. In this regard, frequency density of a CSI-RS may be configured as 3 RE/RB/port. When using X=1 TRS burst, the BS may configure CSI-RS resources #0 and #1, and when using X=2 TRS burst, the BS may configure all of CSI-RS resources #0, #1, #2, and #3. When using X=1 or X=2 TRS burst, the BS may configure the CSI-RS-ResourceRep parameter to be 'ON' such that the UE may perform continuous time/frequency tracking on all 1-port CSI-RSs, assuming a same transmission beam. As another example, when the CSI-RS resources are configured via a TRS, e.g., when a link of corresponding reporting setting or measurement setting is not configured, or when it is clearly configured, via a corresponding CSI-RS, that time/frequency tracking can be performed, it is possible to configure that all CSI-RS ports belonging to CSI-RS resources can be assumed as a same antenna port, regardless of ResourceRep parameter configuration with respect to each of the CSI-RS resources.

In FIGS. 11 and 12, subcarrier locations of 1-port CSI-RS resources and OFDM symbol locations may be appropriately changed according to TRS subcarrier locations of FIGS. 9 and 10.

Figure 13:
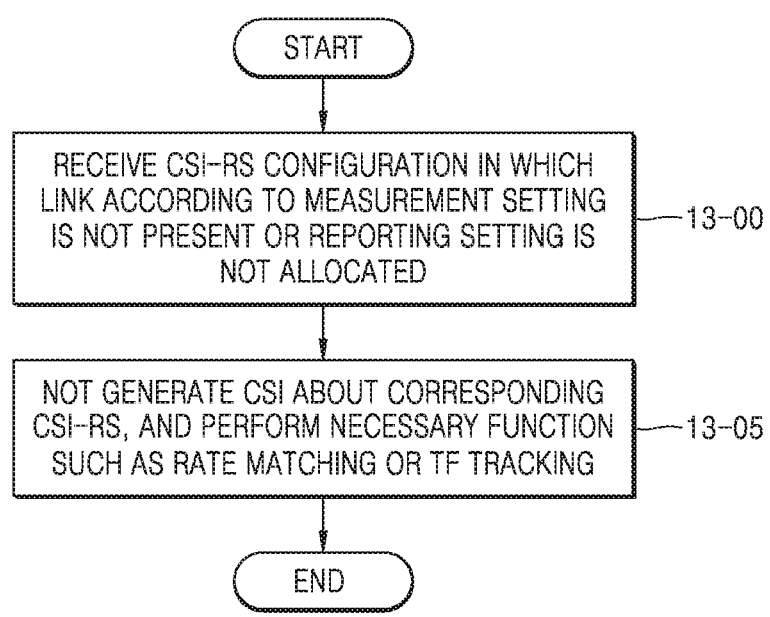
FIG. 13 illustrates a flowchart of a method of configuring a RS, according to an embodiment.

FIG. 13 illustrates a flowchart of a method of configuring a RS, according to an embodiment.

In operation 13-00, a UE may receive CSI-RS configuration in which a link according to measurement setting is not present or reporting setting is not allocated. In operation 13-05, the UE may not generate CSI about a corresponding CSI-RS, may perform a necessary function such as rate matching or TF tracking, and thus may save power.

According to an embodiment, the UE may receive CSI-RS configuration, and may determine, based on the CSI-RS configuration, whether to generate CSI about a CSI-RS corresponding to the received CSI-RS configuration. When the UE receives CSI-RS configuration in which a link according to measurement setting is not present or reporting setting is not allocated, the UE may not generate CSI about a corresponding CSI-RS, may perform a necessary function such as rate matching or TF tracking, and thus may save power. The function to be performed by the UE is not limited to rate matching or TF tracking, and the UE may perform other functions.

Figure 14:
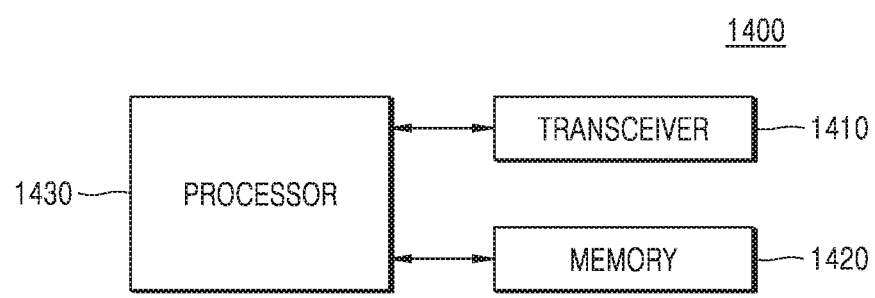
FIG. 14 is a block diagram illustrating a structure of a user equipment (UE), according to an embodiment.

FIG. 14 is a block diagram illustrating a structure of a UE, according to an embodiment.

Referring to FIG. 14, a UE 1400 may include a transceiver 1410, a memory 1420, and a processor 1430. The transceiver 1410, the memory 1420, and the processor 1430 of the UE 1400 may operate based on the aforementioned communication method performed by the UE 1400. However, elements of the UE 1400 are not limited to the aforementioned example. For example, the UE 1400 may include more elements than the aforementioned elements or may include fewer elements than the aforementioned elements. Also, the transceiver 1410, the memory 1420, and the processor 1430 may be integrated to one chip.

The transceiver 1410 may transmit and receive signals to and from a BS. Here, the signals may include control information and data. To this end, the transceiver 1410 may include a radio frequency (RF) transmitter for up-converting a frequency of and amplifying a signal to be transmitted, and an RF receiver for low-noise amplifying and down-converting a frequency of a received signal. However, these are merely examples of the transceiver 1410, and the elements of the transceiver 1410 are not limited to the RF transmitter and the RF receiver.

The transceiver 1410 may receive a signal through a radio channel and output the signal to the processor 1430, and may transmit a signal output from the processor 1430, through a radio channel.

The memory 1420 may store the program and data necessary for operations of the UE 1400. Also, the memory 1420 may store control information or data included in a signal obtained by the UE 1400. The memory 1420 may be implemented as a storage medium including a read-only memory (ROM), a random access memory (RAM), a hard disk, a compact disc-ROM (CD-ROM), a digital versatile disc (DVD), or the like, or any combination thereof.

The processor 1430 may control a series of procedures to make the UE 1400 operate according to the afore-described embodiments. According to an embodiment, the processor 1430 may control the elements of the UE 1400 in such a manner that the UE 1400 receives CSI-RS configuration in which a link according to measurement setting is not present or reporting setting is not allocated, does not generate CSI about a corresponding CSI-RS, performs a necessary function such as rate matching or TF tracking, and thus saves power.

Figure 15:
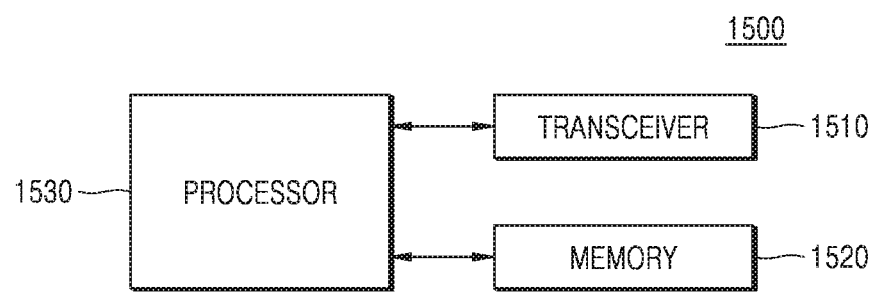
FIG. 15 is a block diagram illustrating a structure of a base station (BS), according to an embodiment.

FIG. 15 is a block diagram illustrating a structure of a BS, according to an embodiment.

Referring to FIG. 15, a BS 1500 may include a transceiver 1510, a memory 1520, and a processor 1530. The transceiver 1510, the memory 1520, and the processor 1530 of the BS 1500 may operate based on the aforementioned communication method performed by the BS 1500. However, elements of the BS 1500 are not limited to the aforementioned example. For example, the BS 1500 may include more elements than the aforementioned elements or may include fewer elements than the aforementioned elements. Also, the transceiver 1510, the memory 1520, and the processor 1530 may be integrated to one chip.

The transceiver 1510 may transmit and receive signals to and from a UE. Here, the signals may include control information and data. To this end, the transceiver 1510 may include a RF transmitter for up-converting a frequency of and amplifying a signal to be transmitted, and an RF receiver for low-noise amplifying and down-converting a frequency of a received signal. However, these are merely examples of the transceiver 1510, and the elements of the transceiver 1510 are not limited to the RF transmitter and the RF receiver.

The transceiver 1510 may receive a signal through a radio channel and output the signal to the processor 1530, and may transmit a signal output from the processor 1530, through a radio channel.

The memory 1520 may store the program and data necessary for operations of the BS 1500. Also, the memory 1520 may store control information or data included in a signal obtained by the BS 1500. The memory 1520 may be implemented as a storage medium including a ROM, a RAM, a hard disk, a CD-ROM, a DVD, or the like, or any combination thereof.

The processor 1530 may control a series of procedures to make the BS 1500 operate according to the afore-described embodiments of the disclosure. According to an embodiment, the processor 1530 may control each element of the BS 1500 to configure at least one of resource setting, measurement setting, and report setting to the UE.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined to be implemented, when required. For example, portions of the methods provided by respective embodiments (e.g., the first embodiment, the second embodiment, and the third embodiment) of the disclosure may be combined with each other to enable the BS and the UE to operate. Also, although the embodiments are described based on the NR system, modifications based on the technical scope of the embodiments may be applied to other communication systems such as frequency-division duplexing (FDD) or time-division duplexing (TDD) LTE systems, or the like.

The exemplary embodiments of the disclosure are provided with reference to the specification and the accompanying drawings. The terminology used herein is for the purpose of describing particular embodiments and promoting an understanding of the disclosure only and is not intended to be limiting of the disclosure. While one or more embodiments have been described with reference to the figures, it will be understood by those of ordinary skill in the art that various changes in form and details may be made therein without departing from the spirit and scope as defined by the following claims.

The invention claimed is:

1. A method, performed by a user equipment (UE), of communicating based on reference signal configuration, the method comprising:
receiving, from a base station, a channel state information, CSI, configuration information;
obtaining at least one channel state information reference signal (CSI-RS) resource setting, at least one CSI-RS reporting setting and a measurement setting based on the CSI configuration information;
determining whether a CSI-RS resource setting from among the at least one CSI-RS resource setting is linked to the at least one CSI-RS reporting setting based on the measurement setting; and
based on a result of the determining, generating CSI for the CSI-RS resource setting and transmitting the generated CSI, in case that the CSI-RS resource setting is linked to the at least one CSI-RS reporting setting, and performing a time/frequency tracking operation, in case that the CSI-RS resource setting is not linked to the at least one CSI-RS reporting setting,
wherein the performing of the time/frequency tracking operation comprises:
obtaining, from the CSI configuration information, CSI-RS resource repetition information determined based on a number of tracking reference signal (TRS) bursts and a number of CSI-RS resources per resource set;
identifying, based on the resource repetition information, at least one CSI-RS among a plurality of CSI-RS on the CSI-RS resource setting not linked to the at least one CSI-RS reporting setting; and
performing the time/frequency tracking operation based on the identified CSI-RS.

2. The method of claim 1, wherein the measurement setting includes at least one of identification information about the at least one CSI-RS reporting setting corresponding to the at least one CSI-RS resource setting or information indicating a corresponding relation between the at least one CSI-RS reporting setting and the at least one CSI-RS resource setting.

3. The method of claim 1, wherein the at least one CSI-RS resource setting comprises at least one resource set, wherein the at least one resource set comprises resource information comprising at least one of type information about a RS, a transmission characteristic of the RS, and location information about a resource element (RE) at which the RS is to be transmitted.

4. The method of claim 1, wherein the at least one CSI-RS reporting setting comprises at least one of reporting interval information, channel information used for reporting, and frequency and time information used for reporting.

5. A method, performed by a base station (BS), of communicating based on reference signal configuration, the method comprising:
transmitting, to a user equipment (UE), channel state information reference signal (CSI-RS) resource configuration information including at least one CSI-RS resource setting, at least one CSI-RS reporting setting, a measurement setting and CSI-RS resource repetition information; and
receiving CSI for a CSI-RS resource setting linked to the at least one CSI-RS report setting,
wherein the measurement setting includes at least one of identification information about the at least one CSI-RS reporting setting corresponding to the at least one CSI-RS resource setting or information indicating a corresponding relation between the at least one CSI-RS reporting setting and the at least one CSI-RS resource setting,
wherein the CSI-RS resource repetition information is determined based on a number of tracking reference signal (TRS) bursts and a number of CSI-RS resources per resource set,
based on the resource repetition information, at least one CSI-RS is identified, at the UE, among a plurality of CSI-RS on CSI-RE resource setting not linked to the at least one CSI-RS report setting; and
the time/frequency tracking operation is performed at the UE based on the identified CSI-RS.

6. The method of claim 5, wherein the at least one CSI-RS resource setting comprises at least one resource set, wherein the at least one resource set comprises resource information comprising at least one of type information about a RS, a transmission characteristic of the RS, and location information about a resource element (RE) at which the RS is to be transmitted and
wherein the at least one CSI-RS reporting setting comprises at least one of reporting interval information, channel information used for reporting, and frequency and time information used for reporting.

7. A user equipment (UE) for performing communication based on reference signal configuration in a wireless communication system, the UE comprising:

a transceiver; and
a processor configured to:
receive, via the transceiver, from a base station (BS), channel state information reference signal (CSI-RS) configuration information,
obtain at least one CSI-RS resource setting, at least one CSI-RS reporting setting and a measurement setting, based on the CSI configuration information,
determine whether a CSI-RS resource setting from among the at least one CSI-RS resource setting is linked to the at least one CSI-RS reporting setting based on the measurement setting, and
based on a result of the determining, generate CSI for the CSI-RS resource setting and transmit the generated CSI, if the CSI resource setting is linked to the at least one CSI-RS reporting setting, and perform a time/frequency tracking operation, if the CSI resource setting is not linked to the at least one CSI-RS reporting setting,
wherein the processor is further configured to:
obtain, from the CSI configuration information, CSI-RS resource repetition information determined based on a number of tracking reference signal (TRS) bursts and a number of CSI-RS resources per resource set;
identify, based on the resource repetition information, at least one CSI-RS among a plurality of CSI-RS on the CSI-RS resource setting not linked to the at least one CSI-RS reporting setting; and
perform the time/frequency tracking operation based on the identified CSI-RS.

8. The UE of claim 7, wherein the measurement setting includes at least one of identification information about the at least one CSI-RS reporting setting corresponding to the at least one CSI-RS resource setting or information indicating a corresponding relation between the at least one CSI-RS reporting setting and the at least one CSI-RS resource setting.

9. The UE of claim 7, wherein the at least one CSI-RS resource setting comprises at least one resource set, wherein the at least one resource set comprises resource information comprising at least one of type information about a RS, a transmission characteristic of the RS, and location information about a resource element (RE) at which the RS is to be transmitted.

10. The UE of claim 7, wherein the at least one CSI-RS reporting setting comprises at least one of reporting interval information, channel information used for reporting, and frequency and time information used for reporting.

11. A base station (BS) for performing communication based on reference signal configuration in a wireless communication system, the BS comprising:
a transceiver;
a processor configured to:
transmit, via the transceiver, to a user equipment (UE), channel state information reference signal (CSI-RS) resource configuration including at least one CSI-RS resource setting, at least one CSI-RS reporting setting and a measurement setting, and
receive CSI for a CSI-RS resource setting linked to the at least one CSI-RS report setting,
wherein the measurement setting includes at least one of identification information about the at least one CSI-RS reporting setting corresponding to the at least one CSI-RS resource setting or information indicating a corresponding relation between the at least one CSI-RS reporting setting and the at least one CSI-RS resource setting,
wherein the CSI-RS resource repetition information is determined based on a number of tracking reference signal (TRS) bursts and a number of CSI-RS resources per resource set,
based on the resource repetition information, at least one CSI-RS is identified, at the UE, among a plurality of CSI-RS on CSI-RE resource setting not linked to the at least one CSI-RS report setting; and
the time/frequency tracking operation is performed at the UE based on the identified CSI-RS.

* * * * *